United States Patent [19]
Johnston

[11] 3,964,958
[45] June 22, 1976

[54] HEAT BONDING DEVICE

[76] Inventor: Orin B. Johnston, 5548 W. 78th St., Minneapolis, Minn. 55435

[22] Filed: Aug. 22, 1974

[21] Appl. No.: 499,449

Related U.S. Application Data

[63] Continuation-in-part of Ser. No. 326,534, Jan. 24, 1973, abandoned.

[52] U.S. Cl. ............................ 156/382; 100/93 P; 100/211; 100/296; 156/285; 156/498; 156/583
[51] Int. Cl.² ....................................... B29C 17/00
[58] Field of Search ........... 156/228, 285, 286, 288, 156/272, 380, 498, 580, 583, 311, 381, 382, 80; 100/93 P, 211, 212, 295, 296, 297; 219/243; 144/256, 281 A, 281 C, 281 D, 281 E, 309 D

[56] References Cited
UNITED STATES PATENTS

| | | | |
|---|---|---|---|
| 1,806,861 | 5/1931 | Owen | 156/498 |
| 2,298,037 | 10/1942 | Crandell | 144/281 A |
| 2,859,796 | 11/1958 | Taunton | 100/211 |
| 3,383,265 | 5/1968 | Garabedian | 156/272 |
| 3,738,890 | 6/1973 | Johnson et al. | 156/286 |

*Primary Examiner*—Caleb Weston
*Attorney, Agent, or Firm*—Lew Schwartz; Wayne A. Sivertson

[57] ABSTRACT

A device for heat bonding thermoplastic materials. At least one pressure chamber having a diaphragm is spaced from a supporting surface with the diaphragm and supporting surface in opposing relation to each other. Materials to be bonded are positioned between the pressure chamber diaphragm and supporting surface and the pressure in the chamber is raised above ambient pressure causing a deflection of the diaphragm. The amount of diaphragm deflection increases with the distance from the pressure chamber side wall. Either the supporting surface or the pressure chamber, or both, is moved toward the other causing a contact between the deflected diaphragm, supporting surface and the materials to be bonded. As the relative movement continues, the contact area with the materials to be bonded increases thereby progressively expelling air trapped between the materials. When the materials to be bonded are fully supported by the opposing diaphragm and supporting surface, the chamber pressure is greatly increased and heat is applied to the materials through the diaphragm by a heating element carried by the diaphragm. Provision may also be made for cooling of the materials once the bond has been effected.

23 Claims, 17 Drawing Figures

U.S. Patent June 22, 1976 Sheet 4 of 4 3,964,958
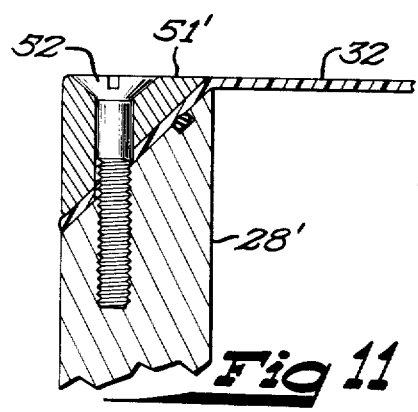
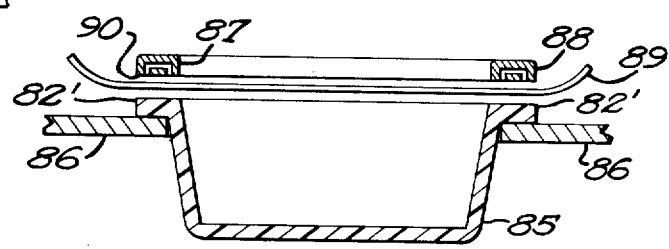
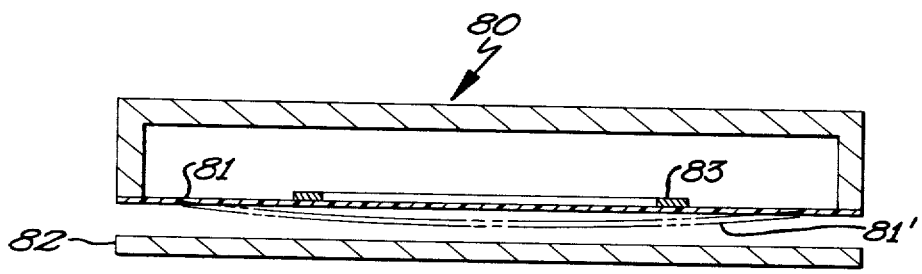
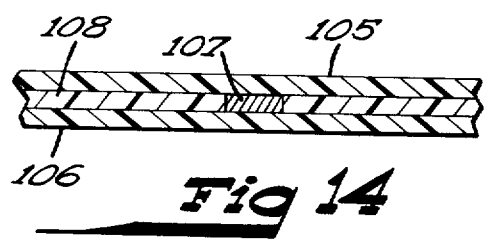
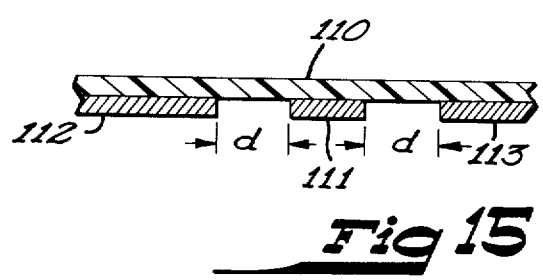
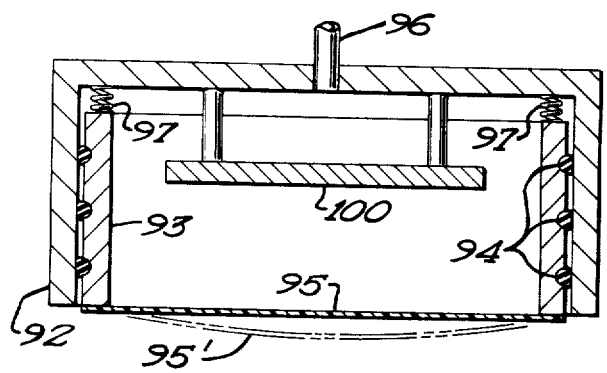
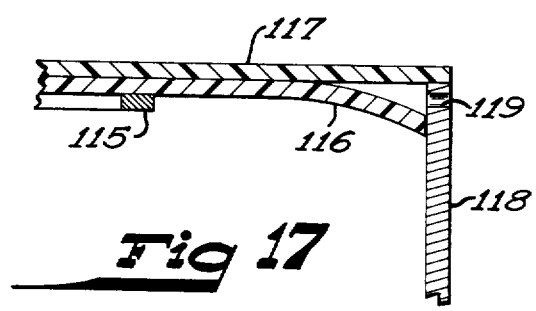

3,964,958

HEAT BONDING DEVICE

CROSS-REFERENCES TO RELATED APPLICATIONS

This application is a continuation-in-part of my copending application, Ser. No. 326,534, filed Jan. 24, 1973, entitled: HEAT BONDING DEVICE.

BACKGROUND OF THE INVENTION

The bonding of thermoplastic material through the application of heat and pressure is well known in the prior art. Devices to accomplish such bonding have commonly taken the form of a supporting platen and heated die combination. The materials to be bonded are placed upon the platen and the heated die is pressed on the material. It is critical in this type of device that the surface of the die be precisely controlled. That is, any skewing of the die surface from the plane of the supporting platen results in an excessive extrusion of the bonded materials and an unacceptable bond. Indeed, even with the proper orientation of the die surface, the uneven pressure applied to the surface of the materials or, more precisely, the application of pressure only in the site of the intended bond unfailingly produces an extrusuion of the materials thereby causing a severe weakening of the bond. Further, variations in material thickness causes an effect similar to that caused by a skewed die surface which cannot be compensated for in this device.

An alternative method of bonding thermoplastic materials is disclosed in U.S. Pat. No. 2,705,523. In this patent, there is disclosed a device having a working surface upon which the materials to be bonded are placed. A hood is lowered into contact with the materials to form a pressure chamber in combination with the materials. The chamber is then pressurized to a pressure typically higher than 50 psi which pressure becomes the necessary bonding pressure. This system differs from the die bonding system in that the bonding pressure is applied uniformly over the surface of the materials and not just in the area which is to be bonded together.

Although the system of U.S. Pat. No. 2,705,523 can provide a bond superior to that obtainable in the die bonding system, it nevertheless poses significant operational disadvantages. First, an effective seal must be accomplished between the hood and the materials to be bonded. This requires that the hood be precisely aligned with respect to the working surface and the materials. In addition, this system makes no provision for the removal of air which may be trapped between the various layers of the materials. Also, the system does not offer the possibility of accelerating the cooling of the bonded area while the disclosure states that the pressure on the materials being bonded is maintained until such time as the materials have cooled. By accelerating the cooling of the bonded area, it would be possible to move the bonded materials, without damage to the bond, much faster than is possible in a device which relies upon natural cooling. This inability to accelerate cooling of the bonded area necessarily places a limitation on production rate, thereby limiting the utility of the system itself. Finally, the system of U.S. Pat. No. 2,705,523, results in a gradual but certain increase in the temperature of the working surface thus limiting the ability to control the sealing temperature range of the materials being sealed.

SUMMARY OF THE INVENTION

The present invention provides a heat bonding device for thermoplastic materials which essentially eliminates the criticality in alignment between the device components. Extrusion in the bond area, inherent in the die bonding system, is eliminated. Also, preferred embodiments of the present invention have the ability to exel trapped air from between the materials to be bonded. In addition, a cooling capability may be incorporated into the device to cool either the bonded material alone or, in a non-resistance bonding application, the heating element alone or the heating element and the bonded material. This cooling capability increases the potential production rate of the device by restoring the normal strength of the bonded area much faster, thereby allowing a removal of the bonded materials from the device before it would be possible under a natural cooling.

The device of the present invention employs a pressure chamber having a diaphragm, the diaphragm being spaced from and in opposing relation to a supporting surface. The supporting surface may be a second pressure chamber diaphragm or a platen. The materials to be bonded are positioned between the pressure chamber diaphragm and the supporting surface and the chamber pressure is raised above ambient pressure. The increase in pressure causes a diaphragm deflection with the deflection increasing with the distance from the pressure chamber side wall. A relative motion is then imparted to one or both of the pressure chambers or supporting surface so as to move them toward each other and into contact with the materials to be bonded. As this motion increases, the contact area increases thus forcing trapped air from the contact area while providing an escape path through the uncontacted area of the materials. When the entire diaphragm contact surface is in contact with the materials, the chamber pressure is greatly increased, to 100 psi, for example, and heat is applied to the bond area by a heating element carried by at least one diaphragm. The intimate contact between the diaphragm and heating element permits consistent temperature control and uniform seals throughout the seal area and from seal to seal. After the bonding operation has been completed, the bonded area can be cooled to increase the production rate of the device.

BRIEF DESCRIPTION OF THE DRAWINGS

FIG. 11 is a cross section of a portion of still another preferred embodiment.

FIG. 12 is a cross section showing a portion of another preferred embodiment.

FIG. 3 illustrates an application of the preferred embodiment of FIG. 12.

FIG. 14 is a cross section of a portion of another preferred embodiment of the present invention.

FIG. 15 illustrates a portion of still anoother preferred embodiment of the present invention.

FIG. 16 is a cross section showing a portion of another preferred embodiment.

FIG. 17 illustrates a further preferred embodiment of the present invention.

DETAILED DESCRIPTION OF THE DRAWINGS

Figure 1:
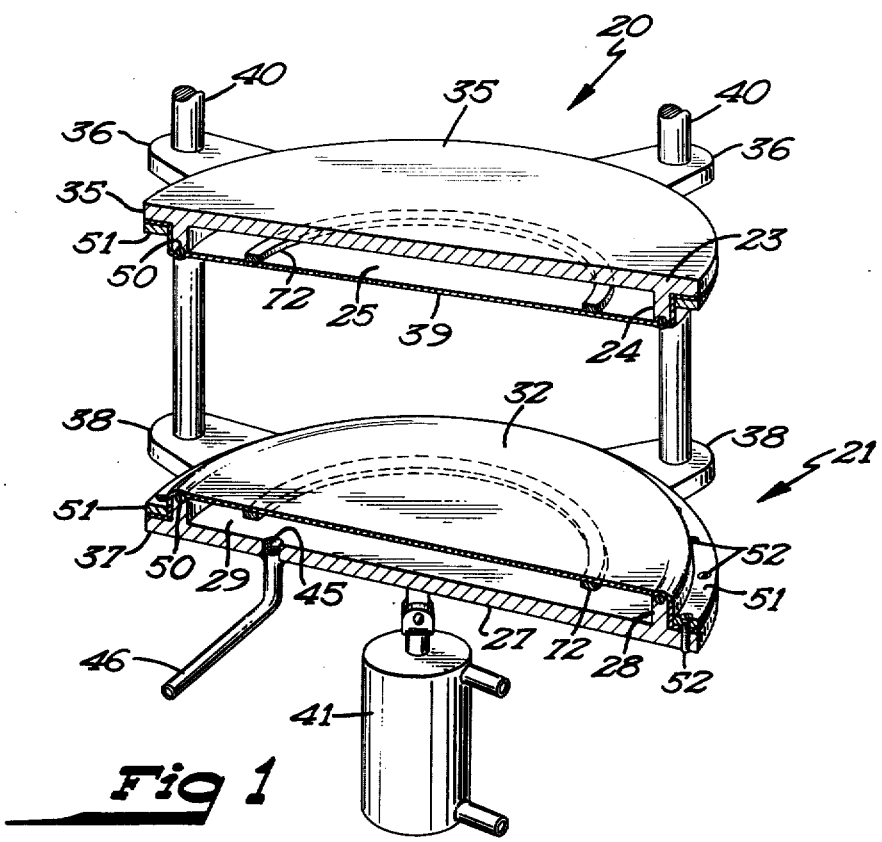
FIG. 1 is a cross section and partial cutaway of a perspective view of a preferred embodiment of the present invention.

FIG. 1, which is a cross section and partial cutaway of a preferred embodiment of the present invention, shows a first pressure chamber 20 and a second pressure chamber 21. Pressure chamber 20 has a web or wall 23 and continuous side wall 24 defining a cavity 25. Similarly, pressure chamber 21 has a web or wall 27 and a continuous side wall 28 which define a cavity 29. Cavities 25 and 29 are enclosed by diaphragms 39 and 32 in a manner to be described more fully below. The pressure chamber 20 has a projecting rim 35 from which a plurality of flanges 36 extend. Pressure chamber 21 has a like rim 37 from which a plurality of flanges 38 extend. The flanges 36 and 38 are bored to accept guide rods 40 which extend between the flanges 36 of pressure chamber 20 and flanges 38 of pressure chamber 21 relative to each other. This movement can be effected in any known manner such as the hydraulic cylinder attached to one or both of the pressure chambers as illustrated at 41. Also, both pressure chambers are provided with a fluid port 45 (one illustrated) which is connected to a device for controlling the pressure within the pressure chambers (not shown) by means of a hose 46.

Figure 2:
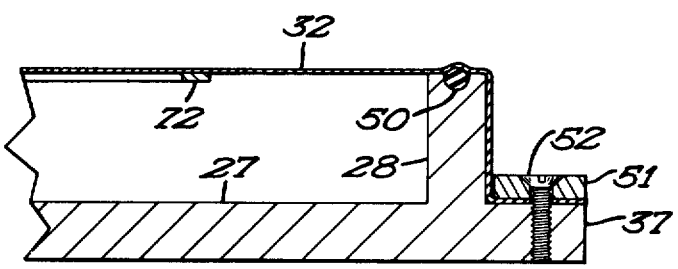
FIG. 2 is a cross section of a portion of the preferred embodiment of FIG. 1.

Referring now to FIG. 2, there is shown more detail of chamber 21 including web 27, its continuous side wall 28 and rim 37. The upper edge of side wall 28 is recessed to accept an O ring 50. the diaphragm 32 lies across the upper edge of the continuous side wall 28 and the recessed O ring 50 and runs down the outside edge of the side wall 28 to lie atop the rim 37. A clamping ring 51 is positioned on top of the diaphragm 32 and extends around the full circumference of the pressure chamber 29 (see FIG. 1). The clamp ring 51 is bored to receive a plurality of bolts and the rim 37 is tapped to engage the threads of the bolts extending through the clamp ring 51.

In the embodiment of FIG. 2, the pressure chambers are assembled by first placing the O ring 50 within the groove in the side wall 28. The diaphragm is then placed over the cavity and down the outside of the side wall 28 to lie on top of the rim 37. The clamp ring 51 is laid on top of the rim 37 with its bolt holes in alignment with the tap holes in the rim 37. The bolts 52 (see FIG. 1) are then placed into position and tightened to draw down on the diaphragm thereby placing the O ring in compression to provide a pressure seal while placing the diaphragm under tension to assure its tautness. The diaphragm can enclose the cavity in any other known manner such as by placing an adhesive along the surface of the side wall where the O ring is positioned. However, it has been found that the clamp ring mode provides an adequate seal and diaphragm tautness in a simple manner.

FIG. 11 illustrates an alternative embodiment to that illustrated in FIG. 2. The pressure chamber side wall 28' has its upper edge beveled. A clamp ring 51' has a cooperating bevel such that when the clamp ring 51' is placed on the beveled edge of the side wall 28' the upper surface of the clamp ring 51' will be generally horizontal. The clamp ring 51' is bored to accept a bolt 52 while the side wall 28' is tapped to accept the threads of the bolt 52. To assemble a pressure chamber in accordance with the preferred embodiment of FIG. 11, a diaphragm 32 is laid across the pressure chamber cavity to lie atop the beveled edge of the side wall 28'. The clamp ring 51' is then placed over the diaphragm 32 in a manner such that the bolt 52 can extend through the bores in the clamp ring 51' and into engagement with the threads of the side wall 28'. Before the clamp ring 51' is tightened by means of the boltss 52, the diaphragm 32 can be placed under tension to any desired degree of tautness, in known manner. While the diaphragm 32 is maintained taut, the bolts 52 are then tightened causing the clamp ring 51' to engage the diaphragm 32 and maintain its position and tautness.

Figures 3, 4:
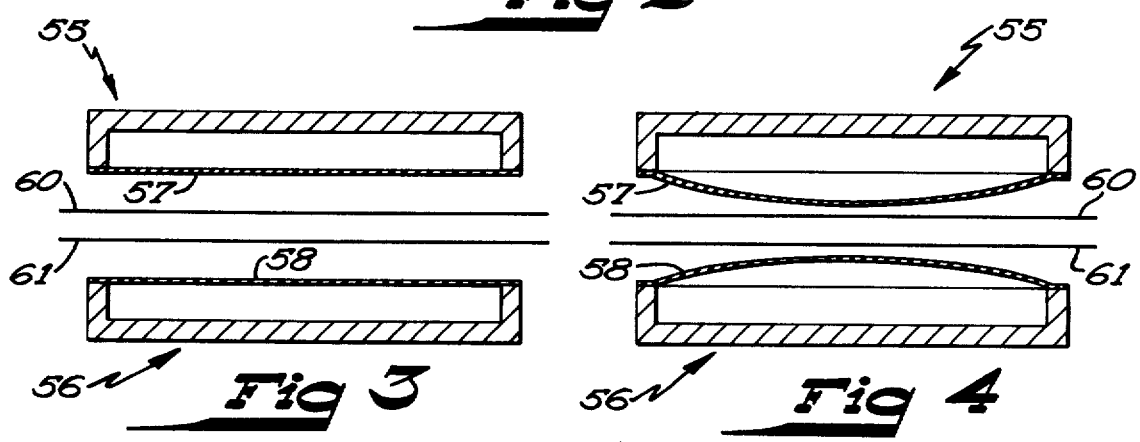
FIGS. 3–7 are cross sections illustrating the cooperation, during the bonding operation, of some of the elements of FIG. 1.
Figure 5:
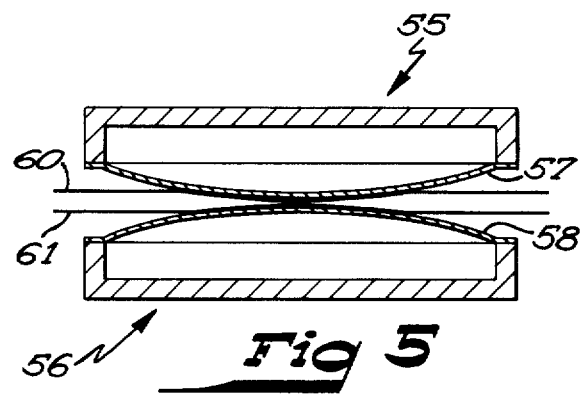
Figure 6:
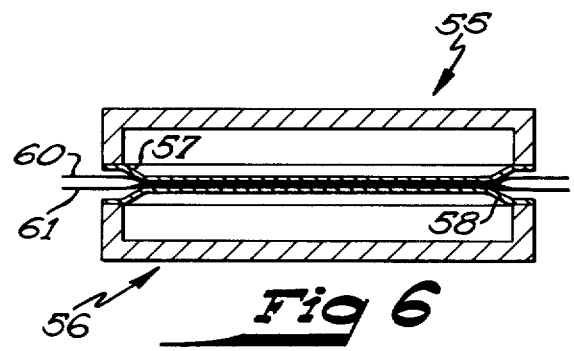
Figure 7:
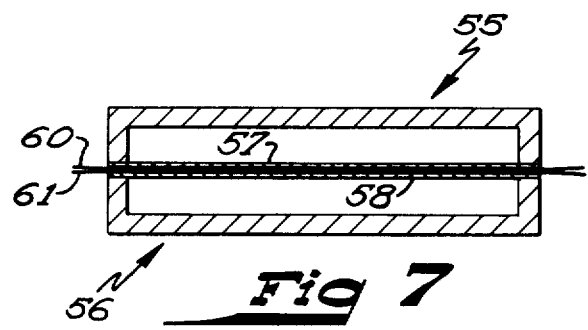

Referring now to FIGS. 3–7 there are shown upper and lower pressure chambers 55 and 56 each having associated diaphragms 57–58. Positioned between the pressure chambers are two sheets or films of thermoplastic material 60 and 61. As illustrated in FIG. 4, the first step in the bonding operation is to raise the pressure in the pressure chambers 55 and 56 above ambient pressure. This causes a deflection of the diaphragms 57 and 58 with the maximum deflection occurring at the point farthest from the side walls of the pressure chambers. One or both of the pressure chambers are moved toward the other (see FIG. 5) making initial contact with the thermoplastic materials 60 and 61 at only a small portion thereof. At this point of initial contact, any trapped air is allowed to escape through those portions of the materials which have not yet made contact with the diaphragms. As the pressure chamber(s) continue to move, the contact area increases (see FIG. 6) until such time as the materials are fully supported above and below by the diaphragms (see FIG. 7).

Figure 8:
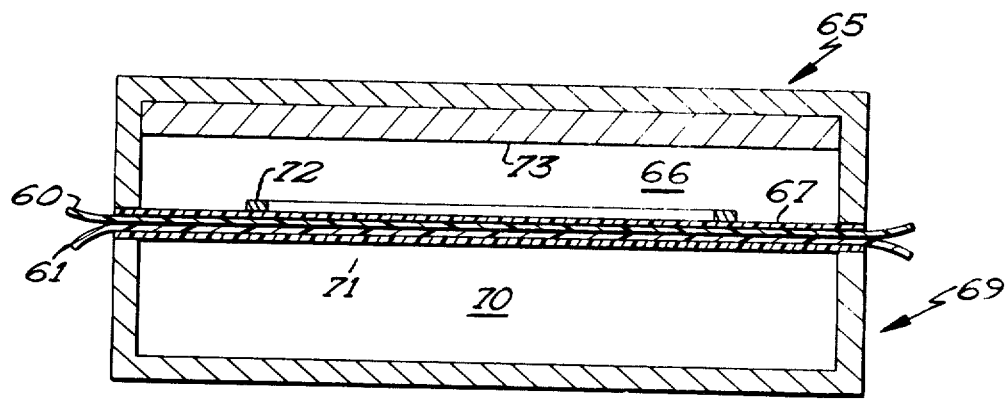
FIG. 8 is a cross section of a preferred embodiment of the present invention.

Referring now to FIG. 8 wherein there is shown an operative bonding device in which trapped air has been expelled through the procedures illustrated with respect to FIGS. 3–7. An upper pressure chamber 65 is formed of a cavity 66 enclosed by a diaphragm 67. A lower pressure chamber 69 is formed of a cavity 70 enclosed by a diaphragm 71. Two sheets or films of thermoplastic material 60 and 61 are supported between the pressure chambers 65 and 69 by the diaphragms 67 and 71. Diaphragm 67 has a non-resistance heating element 72 bonded to its cavity side surface and a refrigerating element 73 is positioned within the cavity 66.

Bonding heat is applied to the thermoplastic materials 60 and 61 through the diaphragm 67 by means of the heating element 72. The bonding pressure is applied uniformly over the surface of the materials 60 and 61 by the pressure within the pressure chambers 65 and 69. A pressure of 100 psi, for example, may be employed as the bonding pressure with many thermoplastic materials. After the required bonding temperature has been applied for the necessary period of time, the pressure in the pressure chamber 65 is reduced below that in the pressure chamber 69 causing the diaphragms 67 and 71 to deflect upwardly carrying the thermoplastic materials 60 and 61 with them. (See FIG. 9) The deflection is sufficient to bring the non-resistance heating element 72 into contact with the refrigerating plate 73 and this contact provides a fast cooling of both the heating element 72 and the thermoplastic materials 60 and 61. With the cooling accomplished, the pressure in the pressure chambers 65 and 69 is equalized and reduced to ambient pressure and the pressure chambers separated and a new set of thermoplastic material inserted for bonding. The bonding temperature, pressure and time are dependent upon the materials being bonded and are easily determined by a person or ordinary skill in the art. However, I have found that with uniform bonding pressures, higher pressures allow bonding at lower temperatures. Also, the use of higher bonding pressure causes stronger and therefore more superior bonds to be formed in some thermoplastic materials.

It is within the scope of this invention to provide heating elements on both of the diaphragms 67 and 71 (see FIG. 1). This will not only provide a more uniform application of heat through all of the materials being bonded but, will also increase the production rate provided by the system. Additionally, a refrigerating plate can be provided within both cavities and the deflection for cooling illustrated in FIG. 9 can be reversed to provide a cooling to both heating elements. Alternatively, it is within the scope of this invention to provide a moveable refrigerating plate or plates which can be moved into contact with the heating elements without the necessity of their being deflected through unequal pressurization of the pressure chambers. Of course, when resistance heating elements are being used it may not be desirable to bring them into contact with a refrigerated plate.

To this point, the present invention has been disclosed in a dual pressure chamber mode. In that mode, each of the opposing diaphragms has functioned as a supporting surface for the other. It is within the scope of the present invention, however, to bond some thermoplastic materials with a single pressure chamber and a diaphragm supporting surface other than another diaphragm. A preferred embodiment of such a system is illustrated in FIG. 12 in which a pressure chamber 80 having a cavity enclosed by a diaphragm 81 is shown with its diaphragm in opposing relation to a supporting surface 82. The pressure chamber diaphragm 81 is provided with a heating element 83, both of which may be identical to any of those discussed above with respect to a two pressure chamber system. Additionally, the method by which the pressure in the pressure chamber 80 is controlled and the means by which the pressure chamber 80 and the supporting surface 82 are moved relative to each other may be as described above. When appropriate, the pressure chamber 80 may be provided with a refrigerated plate such as that shown in FIGS. 8 and 9.

In operation, the materials to be bonded are positioned between the supporting surface 82 and the opposing diaphragm 81. The pressure within the pressure chamber 80 is then raised above ambient pressure causing the diaphragm 81 to deflect as illustrated in phantom at 81' in FIG. 12. With the diaphragm thus deflected, a relative movement between the pressure chamber 80 and supporting surface 82 is effected causing an increasing contact area between the diaphragm 81' and the supporting surface 82 thus expelling trapped air as discussed above with reference to FIGS. 3–7. When the supporting surface 82 fully supports the diaphragm 81, the pressure within the pressure chamber 80 may be increased to the bonding pressure and the bonding accomplished by heating through the diaphragm 81 with the heating element 83. In the embodiment of FIG. 12, pressure and temperature considerations are identical to those discussed above in the double diaphragm mode. However, after successive bonding operations the supporting surface or platen 82 will exhibit a continually increasing temperature. This temperature increase is present particularly in metal platens and will interfere with the ability to control the sealing temperature. For this reason, the supporting surface 82 may be connected to a heat sink, in known manner, to control the harmful temperature increase. It should be pointed out that the increase in the temperature of the platen 82 is a result of the platen serving as a heat sink during the bonding operation. Along with the heating of the platen, the presence of a heat sink during the bonding operation severely limits the ability to control bond widths in a seaming operation, for example. This heat sink effect is not present in the dual pressure chamber mode which makes that mode superior for many bonding operations.

The essential requirement of the supporting surface 82 in FIG. 12 is that it be co-extensive with the cavity of the pressure chamber 80 and be sufficiently rigid to support the diaphragm 81 when the pressure chamber is pressurized. Platens such as those used in the prior art bonding devices are adequate for this purpose. Also, in some situations, it is possible for one of the materials being bonded to function as the supporting surface 82. An example of such an application is illustrated in FIG. 13 which shows a thermoplastic cuplike member 85 having a lip 82'. In many applications, and most notably in the packaging of food products, it is often desired to accomplish a seal between the upper surface of the lip 82' and another thermoplastic material. This may be accomplished with a modification of the embodiment of FIG. 12 by supporting the lip 82' by member 86 and forming an annular pressure chamber whose inner surface 87 has a diameter generally corresponding to the opening in the cup 85 with the outer surface 88 being spaced from the inner surface 87 by an amount generally corresponding to the width of the lip 82'. Again, the lip 82' must be co-extensive with the cavity formed between the annular walls 87 and 88. With the pressure chamber configured as described, a sheet or film of thermoplastic material 89 is positioned between a lip 82' and the heating element carrying diaphragm 90 which covers the cavity formed by the annular walls 87 and 88. The pressure chamber then may be moved toward the lip 82' until it fully supports the diaphragm 90, the pressure chamber pressurized and heat applied through the diaphragm 90 by the heating element it carries. In this manner, the thermoplastic material 89 will be bonded to the lip 82'. The lip 82' may also be supported by a second pressure chamber diaphragm, with or without a heating element, which will have the advantage of compensating for variations in the thickness of the material 89 and lip 82' to a greater degree than is possible in the single chamber mode. Also, a dual chamber mode will eliminate heat sink effects, as described above.

Referring now to FIG. 16 there is shown another preferred embodiment of a pressure chamber which may be employed in either the single or double pressure chamber modes discussed above. A web or plate 91 has a continuous side wall 92. A cavity forming member 93 within the continuous side wall 92 forms a pressure chamber with the web 91 and side wall 92. The pressure chamber is formed by providing a seal between the opposing faces of the side wall 92 and member 93 as by O-rings 94. A diaphragm 95 spans the cavity formed by the member 93 in the same manner as the other cavity enclosing diaphragms discussed above. The pressure chamber of FIG. 16 is expandable in obvious manner with the member 93 moving relative to the side wall 92 while the O-rings maintain a seal therebetween. The expansion may be controlled through an inlet 96 by controlling the pressure within the pressure chamber. In addition to pressure control, the inlet 96 may be employed to control the relative position of the member 93 with respect to the side wall 92, in known manner. Alternatively, member 93 may be spring biased against expansion of the pressure chamber by means of springs 97. The springs 97, which provide a resistance against expansion of the pressure chamber, allow a deflection of the diaphragm 95 to the position illustrated in phantom at 95' when the pressure in the pressure chamber is raised above ambient pressure. In this way, the embodiment of FIG. 16 may be employed to expel air trapped between the materials to be bonded in a manner similar to that discussed above. When appropriate, the pressure chamber may be provided with a refrigerated plate or heat sink 100 whose operation is identical to that of the plate 73 in FIGS. 8 and 9. Additionally, appropriate stops or other mechanisms may be provided to the embodiment of FIG. 16 to limit the motion of the member 93 with respect to the side wall 92.

The heating elements employed in the practice of the present invention may be of many known types found in the prior art. For example, the bonding may be accomplished through resistance or thermo-bonding techniques wherein the heating element is maintained at a constant temperature. Alternatively, the bonding may be accomplished through an impulse technique wherein a high voltage is applied to the heating element to rapidly bring it up to a temperature whenever the temperature is needed. Another alternative variously goes by the name dielectric, electronic, high frequency or radio bonding. This type of bonding requires a "heating" element on both sides of the materials to be bonded with a high frequency voltage placed on both and, in this context, the "heating" element is not itself hot but is the means by which the necessary bonding heat is generated in the material. Therefore, applying heat "through" a diaphragm is intended, where appropriate, to mean that the materials to be heated are on one side of the diaphragm with the means for generating the heat within them on the other and in intimate contact with the diaphragm for consistent temperature control.

All of the heating elements employed in the practice of the present invention may be made of many known materials which have been previously employed for this purpose. For example, stainless steel, copper, copper-nickel alloy and nickel have all been used successfully. Any necessary connection to the heating element may be made through the side wall or the upper plate or web of the pressure chamber. Further, both the heating element and the pressure chamber may take any configuration necessary for a particular application. That is, the heating element may be in the form of a flat ribbon as illustrated in FIGS. 1, 2, 8, 9, 12, 13, 14 or 15. This ribbon may conform to any desired seam configuration. Also, as will be discussed below, heating elements in forms other than flat ribbons may be employed. The pressure chamber may be either round, as shown, square, rectangular or any other shape as desired. In any pressure chamber configuration, there will be a point of maximum deflection when the chamber is under pressure and the maximum deflection will accomplish the desired elimination of trapped air.

I have found that diaphragms having a thickness of 2-6 mils are acceptable for use within the bonding system disclosed herein although any thickness which provides the required properties may be used. Mechanical and other features have lead to my preference for a polyimide film such as that which is available under the trademark Kapton. The diaphragm and heating element combination discussed to this point may be produced through metal evaporation techniques or by adhering the heating element to the diaphragm in any suitable manner. Epoxies and polyesters are suitable for some applications. However, I have found that a fusion bond of the heating element to the polyimide is most desirable, particularly in view of its ability to withstand constant high temperatures. For this purpose I have employed polytetrafluoroethylene, commonly referred to as TFE or PTFE, which is also sold under the trademark Teflon.

Alternatively, a silicone elastomer may be advantageously employed as the diaphragm material. Such materials are more elastic than polyimides which greatly reduces the shear forces at the diaphragm-heating element bond resulting from different coefficients of thermal expansion. A diaphragm of a silicone elastomer can withstand higher temperatures than polyimide for short periods of time and may be formed within the same thickness range as a polyimide diaphragm. The bonding of the heating element may be as described for a polyimide diaphragm. Also, silicone elastomers have a high degree of slip or lubricity which facilitates high production rates by aiding the movement of the materials to be bonded over the diaphragm. A coating of TFE may also be bonded to the diaphragm contact surface, without regard to the material it is made of, to further facilitate the material movement.

Figure 10:
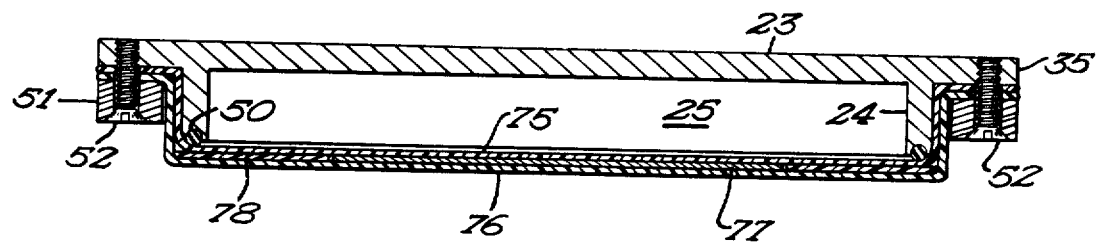
FIG. 10 is a cross section showing a portion of another preferred embodiment.

Referring now to FIG. 10, this is shown a pressure chamber formed in a manner similar to that shown in FIGS. 1 and 2. That is, a top wall 23 has a continuous side wall 24 defining a cavity 25. There is also a rim 35 and clamp ring 51 which cooperate to tension the diaphragm and provide a seal in cooperation with O-ring 50. Of course, after proper tensioning, the diaphragm of FIG. 10 may be held in place as illustrated in FIG. 11. In FIG. 10, the diaphragm consists of a first membrane 75 which extends across the opening of a cavity 25 down the outside of the continuous side wall 24 to lie across the rim 35. A second membrane 76 similarly spans the cavity opening adjacent the diaphragm 75, runs down the side wall 24 in contact with the membrane 75 and lies across the membrane 75 as it itself lies across the rim 35. This embodiment is particularly adapted for laminating thermoplastic materials and, for this reason, is illustrated with a heating element in the form of a metallic sheet 77. It is to be understood that the heating element may take any form and is not limited to the flat sheet illustrated. The metal sheet 77 may be held in place by bonding it, in the manner discussed above, to either or both of the membranes. Alternatively, the metal 77 may be held in place by means of a third membrane 78 surrounding the metallic sheet 77 which third membrane may have the same or similar properties to either of the membranes 75 or 76. As can be seen in the figure, the membrane 78 extends across the face of the cavity opening and is cut out at its center so as to surround the metallic sheet 77. The thickness of the membrane 78 should be no greater than the thickness of metallic sheet 77 to allow contact between the membranes 75 and 76 and the metallic sheet 77. A pressure chamber constructed in this fashion may be used in combination with a pressure chamber such as 69 shown in FIG. 8 to laminate thermoplastic materials or, alternatively, the laminating may be accomplished with a supporting surface such as 82 in FIG. 12 or with the two pressure chambers as shown in FIG. 10 with the diaphragm of the two chambers in opposing relation as illustrated in the embodiment of FIG. 1.

In addition to laminating thermoplastic materials, the pressure chamber of the configuration shown in FIG. 10 is uniquely suitable for forming the fusion bond of the heating element to the diaphragm forming film. Polyimide films are able to withstand temperatures in the range of 900°F. Teflon will form the desired bond at approximately 600°F. By placing a polyimide film and a thin sheet of metal with a layer of Teflon between them into a device composed of at least one pressure chamber configured as shown in FIG. 10, it is possible to fusion bond the polyimide to the metal without destroying the pressure chamber diaphragm. The polyimide-metal combination may then be etched to produce a heating element of any desired configuration which is fusion bonded to the diaphragm.

As discussed above, the diaphragm and heating element materials should be selected such that their coefficients of thermal expansion are approximately equal. With greatly divergent thermal expansion coefficients, the resulting force may cause a separation between the diaphragm and the heating element, a rupture of the diaphragm, or both. To avoid such occurrences, the diaphragm configured as illustrated in FIG. 14 may be employed. FIG. 14 shows a first membrane 105 and a second membrane 106 which support a heating element 107. A filler 108 is provided of substantially the same thickness as the heating element 107 to assure uniform application of pressure. The membranes 105 and 106 may be identical to any of the single membrane diaphragms discussed above.

The diaphragm of FIG. 14 may be formed by initially bonding a heating element 17 to one of the diaphragms 105 or 106. This bonding may be accomplished with the material which softens or loses its bonding strength well below the intended sealing temperature. An example of such a material is ethyl vinyl acetate (EVA) which softens at 170° 180°. The filler 108 may be Teflon, polyimide varnish, silicone varnish or epoxy which variously come in sheet or liquid form. Those in liquid form can commonly be cured by the application of heat. With the diaphragm so constructed, the heating element 107 will be released from its bond below the bonding temperature and thus will be encapsulated to maintain its position while not rigidly held in position to allow for a differential in thermal expansion. Of course, it is within the scope of the present invention to have a diaphragm configured as shown in FIG. 14 with the heating element 107 fusion bonded to either or both of the membranes 105 or 106 with a material that will maintain its bond at the bonding temperature.

The diaphragm-heating element combinations discussed to this point are suitable, in conjunction with any of the disclosed pressure chamber-supporting surface combinations, for sealing all thermoplastic materials. However, some laminated thermoplastic materials have a foil as one of the laminates. An example of such a laminated material is that defined by MIL-131 D Class 1 which is made by Pervel Industries, Inc. and marketed as Plastic P-35. This material has laminated layers of cotton scrim, foil, polyvinyl chloride (PVC) and low density polyethylene. The foil is an aluminum foil having a low specific heat and high thermal conductivity. It has been found that bonding the polyethylene layers of two such laminates produces seams in excess of 1 inch wide with an ⅛ inch heating element. In many applications, a seam of this thickness is excessive. The diaphragm configured as illustrated in FIG. 15 has been employed with an ⅛ inch heating element to provide an ⅛ inch seam at sealing temperatures of 250°F and a sealing pressure of 60 psi.

The diaphragm of FIG. 15 may be employed with a supporting surface 82 (see FIG. 12) or the diaphragm of another pressure chamber in a dual pressure chamber mode. The diaphragm may be a single layer polyimide 110 to which a heating element 111 and heat conducting elements 112 and 113 are bonded. The heat conducting elements 112 and 113 are spaced horizontally from the edges of the heating element 111 by a distance $d$. The distance d is dependent upon the thermal conductivity, specific heat and thickness of the material being sealed. For example, a high thermal conductivity or low specific heat of the material being sealed requires a small distance d to effectively control the seal width. Similarly, the greater the material thickness, the smaller the distance d must be to control seal width. For each diaphragm material and materials to be sealed, the required distance d is easily established. The sections of heat conducting elements 112 and 113 will contact the pressure chamber side walls when the diaphragm of FIG. 15 is in position on a pressure chamber. Thus, the heat conducting elements will themselves act as heat sinks. Alternatively, they may be thermally connected to a heat sink to withdraw heat from the sealing area.

Figure 9:
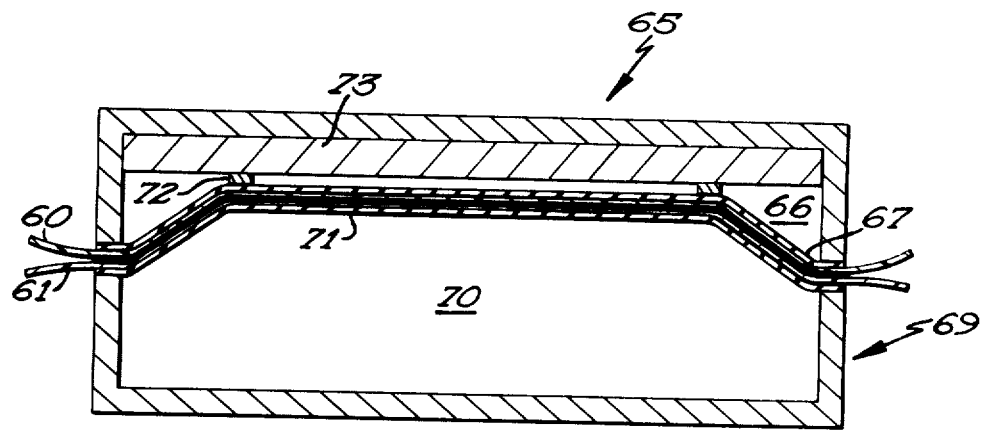
FIG. 9 is a cross section of the preferred embodiment of FIG. 8 in a cooling mode.

From the above it is apparent that the present invention provides a unique device for bonding thermoplastic material, and particularly for seaming such materials. The main advantages of the present invention are obtained by a device which provides for the expelling of trapped air prior to sealing and sealing of the materials under uniform pressure with consistent temperature control. The temperature control is enhanced by the intimate contact between the heating element and pressure chamber diaphragm. Cooling of the heating element (with a non-resistance heating element) may also be accomplished along with a cooling of the bonded materials as illustrated in FIG. 9, for example. In a resistance heating element mode, cooling of the bonded materials may be effected with a diaphragm constructed as illustrated in FIG. 17. In FIG. 17, a resistance heating element 115 is bonded to a diaphragm 116 as described above. A second diaphragm 117 overlies the diaphragm 116. The diaphragms 116 and 117 are not attached to each other. The diaphragm 117 is attached to the edge of side wall 118 of a pressure chamber as described above while the diaphragm 116 is attached to the inside wall of the side wall 118 in any convenient manner. Ports 119 (one shown) pass through the side wall 18 intermediate the diaphragms 116 and 117. After bonding has been completed, the pressure in the pressure chamber is relieved. Air is then introduced through some of the ports 119 and exhausted through others causing a separation of the diaphragms 116 and 117. Separation of the diaphragms 116 and 117 removes the heating element from the bond area while the passing air effects its cooling. The air may be pre-cooled if desired.

Obviously, many modifications and variations of the present invention are possible in light of the above teachings. For example, many of the disclosed pressure chamber configurations and diaphragm configurations may be used interchangeably in either the single or double pressure chamber mode. It is therefore to be understood that, within the scope of the appended claims, the invention may be practiced otherwise than as specifically described.

What is claimed is:

1. In a device for bonding heat bondable materials in a desired seam configuration of the type having means for supporting the material, having means cooperating with said supporting means for applying pressure to the material and having means for applying heat to the material, the improvement which comprises:

said pressure applying means comprising means for applying a uniform pressure over a first area of the supported material, said first area including the area of the desired seam configuration and being large relative thereto and said pressure applying means including a diaphragm in opposing relation to said material supporting means and spanning said first area; and said heat applying means comprising heat generating means in intimate contact with said diaphragm and having a configuration conforming to the desired seam configuration for applying bonding heat to the area of the desired seam configuration of said material through said diaphragm, said heat generating means comprising metallic ribbon means fusion bonded to said diaphragm.

2. The device of claim 1 wherein said supporting means comprises platen means.

3. The device of claim 1 wherein said supporting means comprises a second diaphragm spanning said first area.

4. The device of claim 3 further comprising means for selectively removing heat from said heat applying means.

5. The device of claim 3 wherein said heat applying means further comprises heat generating means in intimate contact with said second diaphragm and having a configuration conforming to the desired seam configuration for applying bonding heat to the area of the desired seam configuration of said material through said second diaphragm.

6. The device of claim 5 wherein said heat generating means comprises metallic ribbon means fusion bonded to each of said diaphragms.

7. The device of claim 5 further comprising means for selectively removing heat from said heat applying means.

8. The device of claim 7 wherein said heat removing means comprises refrigerated means.

9. A device for bonding heat bondable materials in a desired seam configuration which comprises:

pressure chamber means having a cavity enclosed by a deflectable diaphragm, the cavity defining a first area;

support means in opposing relation to said diaphragm, said support means being at least coextensive with said cavity;

means for moving said pressure chamber and said support means relative to each other between a first position wherein said diaphragm and said support means are spaced from each other and a second position wherein said diaphragm is fully supported by said support means;

means for controlling the pressure in said pressure chamber means including means for deflecting said diaphragm with a pressure chamber means pressure above ambient pressure when said pressure chamber means and support means are in said first position and means for increasing the pressure in said pressure chamber means to a desired bonding pressure when said pressure chamber means and support means are in said second position, said deflected diahragm progressively expelling air trapped within said materials during movement from said first position to said second position; and heat generating means in intimate contact with said diaphragm and having a configuration conforming to the desired seam configuration for applying bonding heat to the area of the desired seam configuration, the area of the desired seam configuration being small relative to said first area.

10. In a device for bonding heat bondable materials in a desired seam configuration of the type having means for supporting the material, having means cooperating with said supporting means for applying pressure to the material and having means for applying heat to the material, the improvement which comprises:

said pressure applying means comprising means for applying a uniform pressure over a first area of the supported material, said first area including the area of the desired seam configuration and being large relative thereto, said pressure applying means and said material supporting means each including a diaphragm in opposing relation to each other and spanning said first area;

said heat applying means comprising heat generating means in intimate contact with said diaphragm and having a configuration conforming to the desired seam configuration for applying bonding heat to the area of the desired seam configuration of said material through said diaphragm; and means for selectively removing heat from said heat applying means including refrigerated means.

11. A device for bonding heat bondable materials in a desired seam configuration through the application of heat and pressure which comprises:

means for supporting the material to be seamed;

means for applying a uniform pressure to a first area of the supported material, said first area including the area of the desired seam configuration and being large relative thereto and said pressure applying means including pressure chamber means having a cavity enclosed by a deflectable diaphragm with the diaphragm being in opposing relation to said material supporting means and the expanse of said cavity defining said first area; and heat generating means in intimate contact with said diaphragm within said pressure chamber means and having a configuration conforming to the desired seam configuration for applying bonding heat to the area of the desired seam configuration of said material through said diaphragm.

12. The device of claim 11 wherein said supporting means comprises platen means.

13. The device of claim 11 wherein said heat generating means comprises metallic ribbon means fusion bonded to said diaphragm and further including heat conducting means fusion bonded to said diaphragm inside said pressure chamber, said heat conducting means being in sections with the edge of each section closest to said metallic ribbon means being spaced from said metallic ribbon means by a predetermined amount.

14. The device of claim 11 wherein said heat generating means comprises metallic ribbon means fusion bonded to said diaphragm.

15. The device of claim 11 further comprising means for selectively removing heat from said heat generating means.

16. The device of claim 15 wherein said heat removing means comprises refrigerated means.

17. The device of claim 16 wherein said heat generating means comprises metallic ribbon means fusion bonded to said diaphragm.

18. The device of claim 11 wherein said supporting means and said deflectable diaphragm are normally spaced from each other and further comprising:

means for deflecting said deflectable diaphragm, the deflection of said diaphragm increasing with the distance from the bounds of said cavity; and means for producing a relative movement of said supporting means and said pressure chamber means.

19. The device of claim 18 wherein said supporting means comprises second pressure chamber means having a cavity enclosed by a deflectable diaphragm, said diaphragms being coextensive with and in opposing relation to each other and said deflecting means including means for deflecting said second pressure chamber means diaphragm.

20. The device of claim 19 further comprising heat generating means in intimate contact with said second pressure chamber means diaphragm within said second pressure chamber means and having a configuration conforming to the desired seam configuration for applying bonding heat to the area of the desired seam configuration of said material through said second pressure chamber means diaphragm.

21. The device of claim 20 further comprising means for selectively removing heat from said heat generating means.

22. The device of claim 21 wherein said heat removing means comprises refrigerated means.

23. The device of claim 22 wherein said heat generating means comprises metallic ribbon means fusion bonded to each of said diaphragms.

* * * * *

UNITED STATES PATENT AND TRADEMARK OFFICE
CERTIFICATE OF CORRECTION

PATENT NO. : 3,964,958
DATED : June 22, 1976
INVENTOR(S) : Orin B. Johnston

It is certified that error appears in the above-identified patent and that said Letters Patent are hereby corrected as shown below:

Column 1, line 26, "extrusuion" should be -- extrusion --.

Column 2, line 8, "exel" should be -- expel --.

Column 2, line 67, "FIG. 3" should be -- FIG. 13 --.

Column 3, line 3, "anoother" should be -- another --.

Column 3, line 26, after "chamber 21" should be inserted -- for guiding the movement of the pressure chambers 20 and 21 --.

Column 3, line 37, "the" should be -- The --.

Column 3, line 37, 39, 48, 55, and 60, "O ring" should be -- "O" ring --.

Column 4, line 12, "boltss" should be -- bolts --.

Column 5, line 9, "or" should be -- of --.

Column 7, line 18, "phanton" should be -- phantom --.

Column 8, line 46, "O-ring" should be -- "O" ring --.

Column 9, line 45, "17" should be -- 107 --.

Column 10, line 64, "18" should be -- 118 --.

Signed and Sealed this

Fourteenth Day of September 1976

[SEAL]

Attest:

RUTH C. MASON
*Attesting Officer*

C. MARSHALL DANN
*Commissioner of Patents and Trademarks*